United States Patent [19]

Lapeyre

[11] 4,117,602
[45] Oct. 3, 1978

[54] ELECTROMAGNETIC COMPASS

[75] Inventor: James M. Lapeyre, New Orleans, La.

[73] Assignee: The Laitram Corporation, New Orleans, La.

[21] Appl. No.: 784,272

[22] Filed: Apr. 4, 1977

[51] Int. Cl.$^2$ ............................................. G01C 17/28
[52] U.S. Cl. ........................................ 33/352; 33/313; 33/361; 33/363 K
[58] Field of Search ...................... 33/352, 361, 363 K, 33/313, 356, 362, 318 R, 364

[56] References Cited
U.S. PATENT DOCUMENTS

| 2,054,318 | 9/1936 | Gunn | 33/362 X |
| 3,888,016 | 6/1975 | Fowler | 33/363 K |

FOREIGN PATENT DOCUMENTS 2,230,852 2/1973 Fed. Rep. of Germany ............. 33/362

Primary Examiner—William D. Martin, Jr.
Attorney, Agent, or Firm—Weingarten, Maxham & Schurgin

[57] ABSTRACT

A magnetic compass in which the compass magnet is an electromagnet energized only when in a horizontal disposition to provide a correct heading indication without error due to tilting of the compass magnet.

6 Claims, 1 Drawing Figure

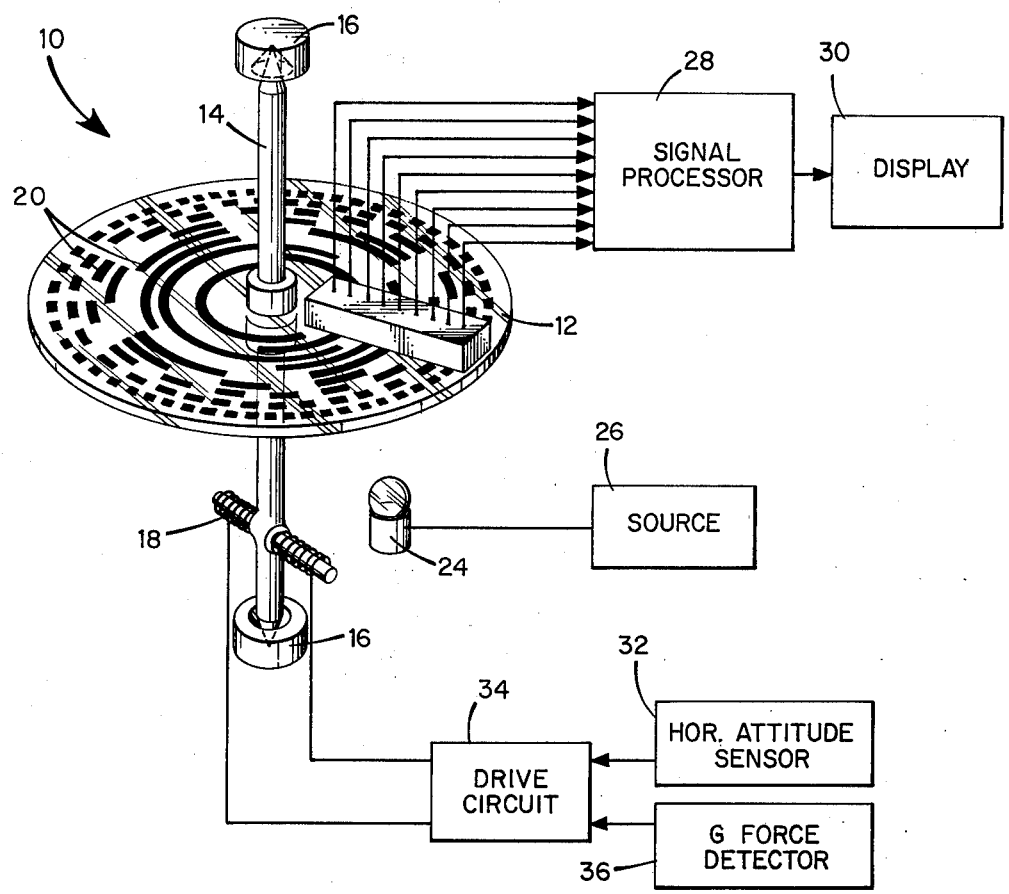

ELECTROMAGNETIC COMPASS

FIELD OF THE INVENTION

This invention relates to magnetic compasses and more particularly to a magnetic compass in which the compass magnet is a selectively energized electromagnet.

BACKGROUND OF THE INVENTION

A magnetic compass seeks the magnetic north position by alignment of the compass magnet with the magnetic field of the earth. It is well known that a magnetic compass provides a correct heading indication only when the magnet is in a horizontal position for alignment with the horizontal component of the earth's magnetic field. If the compass magnet is tilted from its horizontal orientation, as can occur during rolling and pitching of a vessel or other body aboard which the compass is installed, or in a high speed turn, the magnet will tend to seek the dip angle and the compass reading will be in error.

SUMMARY OF THE INVENTION

In accordance with the present invention, a magnetic compass is provided having as the compass magnet an electromagnet which is energized only when in a horizontal disposition to provide a correct compass reading without error due to tilting of the magnet. A horizontal attitude sensor provides a signal indication of intended disposition for energizing the compass electromagnet. The invention in preferred embodiment is employed in a compass of a remote reading type in which the compass disk is coded with sensible indicia representative of compass headings and which are sensed to provide an output signal representative of such headings. The invention can also be employed in a visually read compass.

In another aspect of the invention, the compass electromagnet is energized only when the G force to which the compass is subjected is within a predetermined normal range. A change in G force, caused for example by high speed turning of an aircraft, can be indicative of tilting of the compass magnet and the compass operation is inhibited in the presence of a G force outside of a predetermined range.

DESCRIPTION OF THE DRAWING

The invention will be more fully understood from the following detailed description taken in conjunction with the accompanying drawing, in which the single FIGURE is a diagrammatic representation of a remote reading compass according to the invention.

DETAILED DESCRIPTION OF THE INVENTION

Referring to the drawing there is shown a remote reading digital compass 10 which includes a coded disk 12 affixed to and rotatable with a shaft 14 supported by bearings 16 and disposed along a normally vertical axis. The bearings 16 are supported by a housing of any well known form and which is mounted on a vessel or other body without gimballing and therefore movable with the vessel about its roll and pitch axes. An electromagnet 18 is disposed below disk 12 and is affixed to shaft 14 for rotation with the disk. The electromagnet has its magnetic axis parallel to the plane of disk 12. When energized, the electromagnet 18 will seek alignment with the horizontal component of the earth's magnetic field and disk 12 will be correspondingly aligned to provide a sensible code representing the compass position. The disk 12 is coded by a plurality of concentric tracks 20 each track containing a sequence of alternately light transmissive and opaque segments representing one bit of a multiple bit digital code. A photosensor array 22 is disposed along a radius of disk 12 and includes a plurality of photosensitive elements each operative to sense a respective track 20 of the coded disk.

A light source such as a light emitting diode 24 is disposed on the opposite side of disk 12, and is energized by an electrical source 26 and operative to illuminate tracks 20 for reception by array 22. The array 22 provides a plurality of parallel coded signals representative of the angular position of disk 12 with respect to array 22, these signals being applied to a signal processor 28 which is operative to decode the signals from the array and to drive a display 30 providing a numerical indication of compass heading. The output signal from processor 28 can of course also be applied to an automatic pilot or other utilization apparatus requiring a signal indication of compass heading.

The digital compass is itself known in the art, a preferred embodiment being shown in U.S. Pat. No. 3,888,016 assigned to the assignee of this invention. In the present invention however, the compass magnet is an electromagnet rather than the usual permanent magnet such that compass magnet is selectively energizable under specified conditions.

The electromagnet 18 is energized only when in a horizontal disposition to provide compass operation only when in the correct attitude to produce an output indication of heading which does not suffer from errors due to magnet tilting. A horizontal attitude sensor 32 is provided in association with the compass and which is operative to sense a horizontal reference orientation and provide a signal indicative thereof. The sensor can be within the compass housing or in association therewith to be subject to the same external forces as the compass such that the attitude of the sensor is the same as that of the compass. The attitude sensor 32 can be an inclinometer or other pendulous device which provides an output signal upon sensing of a normally vertical disposition. The sensor signal is applied to drive circuit 34 which is operative in response to the sensor signal to provide an energizing signal to electromagnet 18. The electromagnet is thus energized only when in a horizontal disposition to provide an output indication of compass heading only when the compass is properly disposed for correct reading. In practice, a tolerable range of tilt can be specified in order to provide a compass reading when electromagnet 18 is within the tolerance range. The attitude sensor 32 is implemented to produce an output signal upon sensing of a disposition which is defined as horizontal within a predetermined range of tolerable tilt.

The attitude sensor 32 can be of a type which provides a signal indication of the degree of tilt from the vertical reference. In this case the drive circuit 34 can include means for comparing the sensor signal with a reference value to produce an output signal for energizing electromagnet 18 in response to a sensor signal which is within the predetermined signal range representing a tolerable range of tilt.

In some instances the pendulous attitude sensor will not sense tilt with respect to a reference axis. For example, in a vehicle turn the attitude sensor can remain plumb with respect to the vehicle and cannot therefore sense the tilt with respect to the true vertical axis. In such instances a change in the G force can be indicative to tilt with respect to the true vertical axis. A G force detector 36 can be provided to provide an output signal when the gravimetric force is within a normal range. If a G force is experienced outside of the normal range, an enabling signal is not applied by detector 36 to drive circuit 34, causing de-energizing of electromagnet 18. The detector 36 can also be of the type providing an output signal representative of the magnitude of the G force with drive circuit 34 including means for comparing the signal from detector 36 with a reference value to provide an energizing signal to electromagnet 18 only when the applied G force is within the normal range.

Both the horizontal attitude sensor 32 and the G force detector 36 can be employed in instances where both means for sensing the horizontal disposition of the compass electromagnetic are desirable. In other instances either sensor may be separately employed.

The compass 10 may be mounted within a gimbal structure for maintaining a normally horizontal disposition of disk 12 and electromagnet 18 to thereby minimize spurious tilting movement of the compass. The present invention can be employed to de-energize the compass in the event of tilting movements which may still occur, by detection of the non-horizontal disposition of electromagnet 18 with respect to a true horizontal reference.

The invention is not to be limited by what has been particularly shown and described except as indicated in the accompanying claims.

What is claimed is:

1. A magnetic compass operative to be energized only when the compass magnet is substantially in a horizontal disposition comprising:
    a normally stationary compass disk having indicia thereon representing compass headings;
    means supporting said disk for rotation about its normally vertical axis;
    an electromagnet affixed to and rotatable with said disk, and being non-energized except when in a horizontal disposition;
    means for sensing the horizontal disposition of said electromagnet and providing a signal representative thereof; and
    means operative in response to said signal to provide an energizing signal to said electromagnet to permit alignment of the energized electromagnet with the earth's magnetic field and orientation of the compass disk to provide an indication of compass heading.

2. The magnetic compass of claim 1 wherein said compass disk includes a plurality of concentric tracks each optically coded to represent one bit of a multiple bit digital code;
    and further including:
    means for illuminating the coded tracks of said disk; and
    means for sensing light from the coded tracks of said disk and to provide in response thereto a digital output signal representative of compass heading when said electromagnet is energized.

3. The magnetic compass of claim 1 wherein said horizontal disposition sensing means includes an inclinometer operative to provide a signal indication of horizontal disposition.

4. The magnetic compass of claim 1 wherein said horizontal disposition sensing means includes a G force detector operative to provide a signal indication when applied G force is within a predetermined normal range.

5. The magnetic compass of claim 1 wherein said horizontal disposition sensing means includes:
    an inclinometer operative to provide a signal indication of horizontal disposition; and
    a G force detector operative to provide a signal indication when applied G force is within a predetermined normal range.

6. The magnetic compass of claim 1 wherein said horizontal disposition sensing means includes an attitude sensor operative to provide an output signal indication of horizontal disposition; and
    wherein said electromagnet energizing means includes a drive circuit operative in response to the signal indication from said attitude sensor to provide an energizing signal to said electromagnet.

* * * * *